United States Patent [19]

Brown

[11] 4,098,643
[45] Jul. 4, 1978

[54] DUAL-FUNCTION MAGNETIC STRUCTURE FOR TOROIDAL PLASMA DEVICES

[75] Inventor: Robert L. Brown, Kingston, Tenn.

[73] Assignee: The United States of America as represented by the United States Department of Energy, Washington, D.C.

[21] Appl. No.: 662,776

[22] Filed: Mar. 1, 1976

Related U.S. Application Data

[63] Continuation-in-part of Ser. No. 486,925, Jul. 9, 1974, abandoned.

[51] Int. Cl.² .............................................. G21B 1/00
[52] U.S. Cl. ...................................... 176/3; 335/301; 336/229; 336/234
[58] Field of Search .............. 176/1, 3; 336/233, 197, 336/210, 229, 234; 335/301, 304

[56] References Cited

U.S. PATENT DOCUMENTS

| | | |
|---|---|---|
| 3,663,361 | 3/1972 | Yoshikawa .............................. 176/3 |
| 3,778,343 | 12/1973 | Coppi et al. ............................ 176/3 |

OTHER PUBLICATIONS

Matt-1050, 8/74, pp. 526-529.
Technology Review, 10/76, pp. 20-24, 33-39, 41-43.
Wash-1267, 7/73, pp. 31-34.

Primary Examiner—Harvey E. Behrend
Attorney, Agent, or Firm—Dean E. Carlson; Stephen D. Hamel; Louis M. Deckelmann

[57] ABSTRACT

This invention relates to a support system wherein the iron core and yoke of the plasma current system of a tokamak plasma containment device is redesigned to support the forces of the magnet coils. The containment rings, which occupy very valuable space around the magnet coils, are utilized to serve as yokes for the core such that the conventional yoke is eliminated. The overall result is an improved aspect ratio, reduction in structure, smaller overall size, and improved access to the plasma ring.

4 Claims, 3 Drawing Figures

DUAL-FUNCTION MAGNETIC STRUCTURE FOR TOROIDAL PLASMA DEVICES

BACKGROUND OF THE INVENTION

This invention was made in the course of, or under, a contract with the United States Atomic Energy Commission.

CROSS-REFERENCE TO RELATED APPLICATION

This application is a continuation-in-part of U.S. application 486,925(70), filed July 9, 1974, now abandoned.

A hot plasma, one with a high ion temperature in the collisionless regime, can be produced in a toroidal device known as a tokamak, evidenced in an article published in *Scientific American* 227, July, 1971, pp. 65–75, and entitled "The Tokamak Approach in Fusion Research". The Oak Ridge National Laboratory ORMAK machine is a small-scale version of such a device. The ORMAK device is described in the report ORNL-4688, Section 3, pp. 46–66, dated Dec. 31, 1970. A larger scale ORMAK-type device is described in the application of Arthur P. Fraas, Ser. No. 391,085, filed Aug. 27, 1973, and having a common assignee with the present application.

A portion of the ORMAK device is illustrated in FIG. 1 of the drawing. The plasma ring 4 is shown in cross section, taken in a plane that intersects the major axis 13 of the torus and the yoke 11. A toroidal field coil (or magnet coil) 14 is shown within its containment ring 9. The ferromagnetic core 10 occupies the center of the torus and is surrounded by a plurality of magnet coils 14 and rings 9 held in place by compression rings 15 and 16. The core 10 and yoke 11 are provided with charging windings 17 and 18, respectively, and are separated from each other by the insulation sheets 19 and 20. Because the compression rings 15 and 16 are subject to magnetic lines of force, they are constructed so as to have no completed electrical path that would permit induced currents to flow. Since in a full-scale hot plasma producing device the sizes of the components in FIG. 1 would be massive, the figure should be understood to be illustrative only and does not incorporate engineering considerations.

A plasma current system is an essential feature of a tokamak concept, being the source of the poloidal component of the confining magnetic field and, by virtue of the finite resistance of the plasma, ohmic heating. In principle, the simplest configuration would be one in which a number of windings (conductors), around the circumference of the torus constitute an air-core transformer wherein such current-carrying windings comprise the primary and the plasma ring 4 the (one-turn) secondary.

In another possible configuration, the transformer has a ferromagnetic (iron) core 10 and one or more ferromagnetic return yokes or legs 11 that extend out around the plasma ring and toroidal field coils 14. The return legs impose space and assembly-disassembly problems and must be arranged to avoid saturation by the magnetic flux. Even so, a closed magnetic loop is in general preferable to having no return leg(s) because the magnetic flux returned through the air outside the torus requires extensive magnetic shielding.

It is now well recognized that in any practical design for a large-scale tokamak device for producing a hot plasma there are a great many considerations that will affect the final design. One of these important considerations is the aspect ratio, the ratio of the major diameter to the minor diameter of the torus (AB/BC in FIG. 1). A low aspect ratio, perhaps of the order of 2 or less, is usually preferred from a plasma physics viewpoint. A low aspect ratio is also advantageous from a size and materials point of view because, tending as it does to define a short fat torus, the various parts all tend to occupy the same space toward the center of the torus leading to a smaller overall machine size.

Thus, there exists a need for an improved core and yoke design in the ORMAK device wherein there are provided an improved aspect ratio, a reduction in structure, smaller overall size, and improved access to the plasma ring for diagnostic access and neutral particle injectors into the torus. The present invention was conceived to meet this need in a manner to be described hereinbelow.

SUMMARY OF THE INVENTION

It is the object of the present invention to provide an improved core and yoke arrangement of the plasma current system of a tokamak-type device such as the Oak Ridge National Laboratory ORMAK machine, wherein the above need is met.

The above object has been accomplished in the present invention by combining the functions of the containment rings about the torus magnet coils and the laminated iron flux return yoke or yokes, in that the prior yoke as such is eliminated and becomes in effect a number of yokes that also function structurally as torus magnet coil containment rings. Thus the above need is met by this new core and yoke design.

DESCRIPTION OF THE PREFERRED EMBODIMENT

Figure 1:
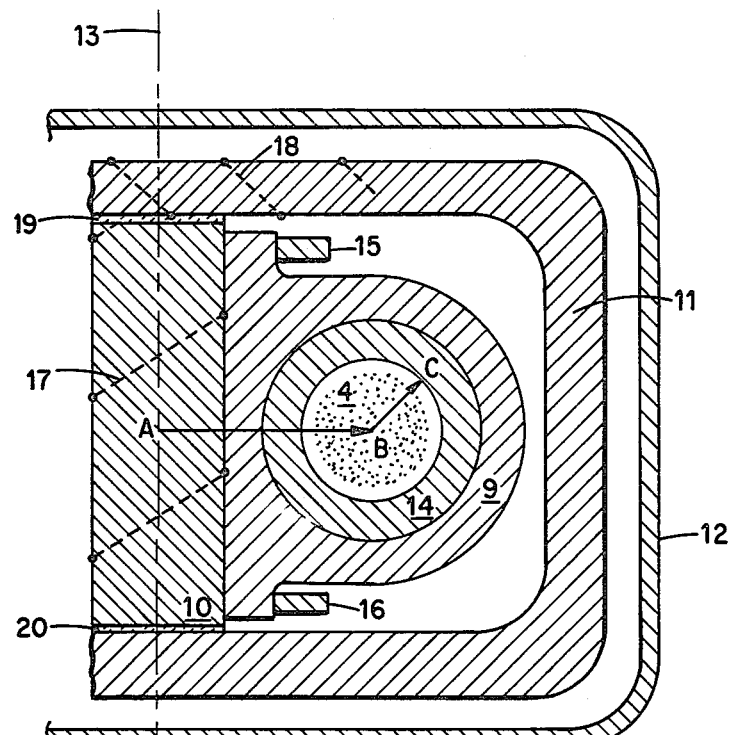
FIG. 1 is a partial sectional illustration of the prior ORNL ORMAK machine.

FIG. 1 has been described above, and it should be understood that only the portions of the ORNL ORMAK machine have been shown which involve the present invention. Further details of the ORMAK machine may be obtained from the above-mentioned report ORNL-4688, and/or of another ORMAK machine from the above-mentioned patent application Ser. No. 391,085.

Figure 2:
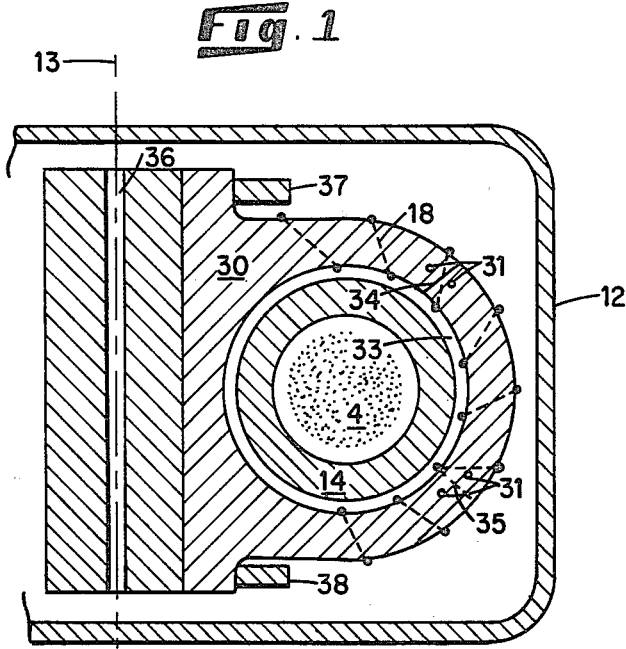
FIG. 2 is a partial sectional illustration of the core and yoke arrangement of the present invention which replaces the arrangement of FIG. 1 in the ORMAK machine.
Figure 3:
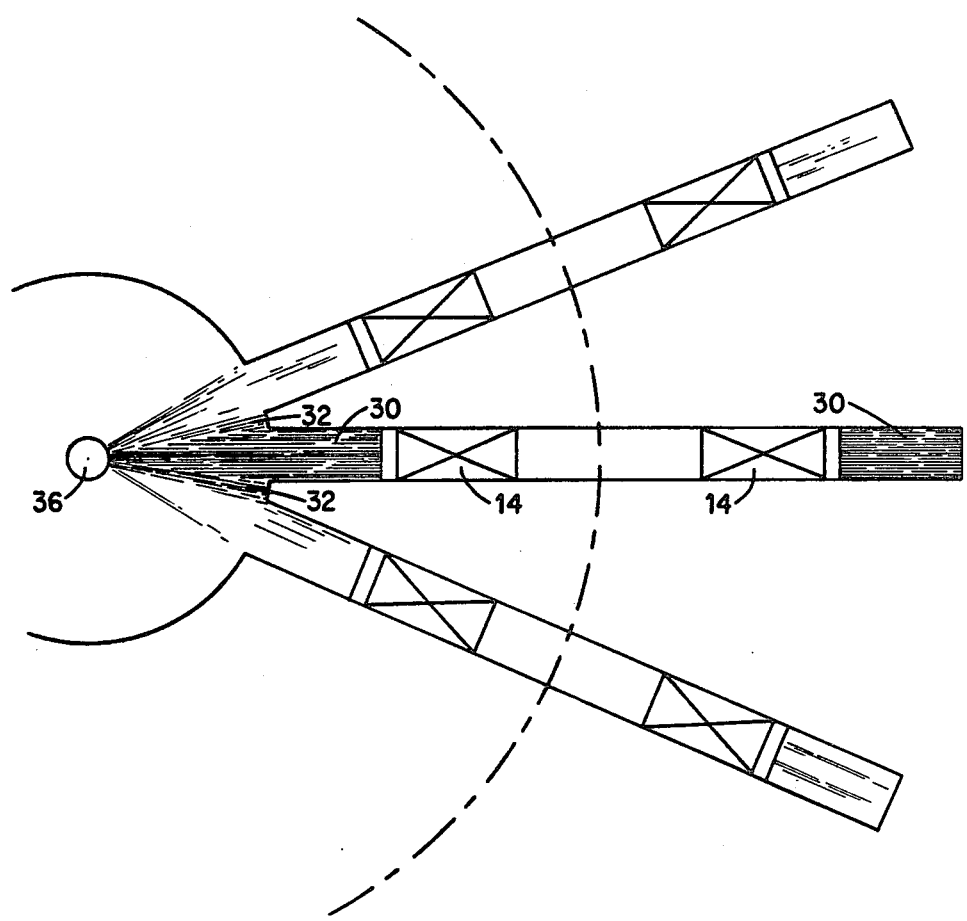
FIG. 3 is an expanded, partial sectional view through the center of some of the magnet coils and combined yokes and magnet containment rings of the device of FIG. 2.

The present invention involves a modification of the arrangement illustrated in FIG. 1, and is illustrated in FIGS. 2 and 3 to which reference is now made. In FIG. 2, laminated sheets of iron 30 are stamped out to encompass the magnet coils 14. The magnet coils 14 encompass a liner, not shown, which defines a plasma containment region 4 in which a plasma torus ring is formed. Alternate sheets 30 would be cut at different places 34, 35, and the individual sheets are coated with plastic insulation so that no electrical path around the circumference is possible. Insulated pins 31 are inserted through all laminations to prevent shearing apart under the radial forces developed in the coils. On the side nearest the major axis, and starting from the center of the stack, laminations are cut progressively smaller so that a wedge-like cross section is formed (FIG. 3). In order to achieve a tighter fit, the wedge surfaces may be faced off for smoothness, and a small hole 36 left in the very center of the core. Extra laminated iron shims 32 are inserted last to allow for coil movement during assembly. These shims are tailored to insure a tight fit for all coils and a maximum amount of iron in the core.

As shown in FIG. 2, the completed lamination stack has a suitable projection at the top and bottom for compression rings 37 and 38. Unlike the conventional design, it is permissible for the new compression rings to form shorted magnetic turns since the flux is expected to take the shorter path through the yoke assembly. A charging winding 18 is wound around the magnetic return yoke 30 for each of laminated structures encompassing a respective torus coil 14. A hollow conductor is utilized for each of the windings 18 if it is desired to control the respective yoke temperature.

In order to deal with the possible problem of iron saturation in the yokes 30 from the toroidal leakage field, a suitable interface 33 to separate the coils 14 from the respective laminations 30 is provided. Such an interface would also accommodate the effect of different coefficients of expansion of the coil and yoke. A material such as a reinforced epoxy or stainless steel may be positioned in the interface 33. Other materials could be used for this purpose. For example, a load-bearing thermal insulator could be used so that massive amounts of iron may be maintained at a warm temperature.

The redesigned iron core and yoke assembly of the present invention, as described above, will result in several significant advantages as follows:

1. More space will be available for the coils and/or the iron core because of gaining the space formerly occupied by the containment rings.

2. A shorter iron circuit will reduce the iron volume and excitation required for the iron.

3. The amount of iron needed in the core will be reduced.

4. The large external yoke is eliminated, permitting a smaller vacuum chamber design or more access space inside the chamber.

5. Reduction of material volume will shorten the cooldown time and heat losses.

6. Fewer parts to fabricate should reduce the initial cost of the device.

7. A better or improved aspect ratio can be provided.

It should be understood that the ultimate goal of any tokamak device is to provide the production of a thermonuclear plasma. However, until such a goal is achieved, the various tokamak devices now in operation do, in fact, produce x-rays, such that they have a secondary utility as x-ray sources.

This invention has been described by way of illustration rather than by limitation and it should be apparent that it is equally applicable in fields other than those described.

What is claimed is:

1. In a tokamak device for producing a plasma with a high ion temperature in the collisionless regime, said device including axially disposed central iron core, and a plurality of toroidal magnet coils defining a main torus, the improvement comprising a respective coil containment ring encompassing each of said torus magnet coils, each of said rings comprising a plurality of plastic coated, laminated iron sheets with alternate sheets being cut at different places so that no electrical path around the circumference of each sheet is possible, a plurality of insulated pins inserted through all of said laminations to prevent shearing apart thereof under the radial forces developed in its associated magnet coil, said laminated iron sheets starting from the center of the stack and on the side nearest the major axis of the torus being cut progressively smaller so that a wedge-like cross section is formed, all of said cross sections constituting a portion of said central iron core, a plurality of respective extra laminated iron shims positioned between each of the respective wedge-like cross sections of adjacent stacked laminations, all of said extra laminated iron shims constituting the remaining portion of said central iron core, each of said laminated iron sheets of each stack provided with a respective projection at the top and bottom thereof and extending beyond said wedge-like cross section, and respective compression rings encompassing said top and bottom projections of all of said stacked laminations, each of said stacks of laminated iron sheets serving not only as a respective magnet coil containment ring but also as a respective magnetic return yoke for said central iron core.

2. The device set forth in claim 1, wherein a respective charging winding is provided for each of said combined containment rings and yokes.

3. The device set forth in claim 2, wherein a respective interface is provided between the outside surface of each respective torus magnet coil and the inside surface of each respective stack of laminated iron sheets.

4. The device set forth in claim 3, wherein each of said interfaces is filled with a material selected from the group consisting essentially of a reinforced epoxy, stainless steel, and a load bearing thermal insulator.

* * * * *